(12) United States Patent
Han et al.

(10) Patent No.: US 10,524,607 B2
(45) Date of Patent: Jan. 7, 2020

(54) COFFEE BREWER

(71) Applicant: TSANN KUEN (ZHANGZHOU) ENTERPRISE CO., LTD., Fujian (CN)

(72) Inventors: Mengxin Han, Fujian (CN); Yanxiang Zhang, Fujian (CN)

(73) Assignee: TSANN KUEN (ZHANGZHOU) ENTERPRISE CO., LTD., Fujian (CN)

( * ) Notice: Subject to any disclaimer, the term of this patent is extended or adjusted under 35 U.S.C. 154(b) by 613 days.

(21) Appl. No.: 15/220,173

(22) Filed: Jul. 26, 2016

(65) Prior Publication Data
US 2017/0027373 A1 Feb. 2, 2017

(30) Foreign Application Priority Data
Jul. 27, 2015 (CN) .......................... 2015 1 0446333

(51) Int. Cl.
*A47J 31/36* (2006.01)
*A47J 31/40* (2006.01)

(52) U.S. Cl.
CPC ......... *A47J 31/405* (2013.01); *A47J 31/3604* (2013.01); *A47J 31/3633* (2013.01); *A47J 31/407* (2013.01)

(58) Field of Classification Search
CPC . A47J 31/3623; A47J 31/3633; A47J 31/3604
See application file for complete search history.

(56) References Cited

U.S. PATENT DOCUMENTS

| | | | | |
|---|---|---|---|---|
| 8,613,246 B2 * | 12/2013 | Ryser | .................. | A47J 31/3633 |
| | | | | 99/289 R |
| 9,131,798 B2 * | 9/2015 | Pagano | ............... | A47J 31/3633 |
| 2009/0007794 A1 * | 1/2009 | Cortese | ............... | A47J 31/3628 |
| | | | | 99/289 R |
| 2013/0092031 A1 * | 4/2013 | Magno | ................ | A47J 31/3633 |
| | | | | 99/297 |

FOREIGN PATENT DOCUMENTS

| | | |
|---|---|---|
| CN | 102188161 A | 9/2011 |
| CN | 102599817 A | 7/2012 |
| WO | 2011114179 A1 | 9/2011 |
| WO | 2013008141 A1 | 1/2013 |

OTHER PUBLICATIONS

WO 2015/086371 (Bonacci et al.) Jun. 2015.*
Search Report appended to an Office Action issued to Chinese counterpart application No. 201510446333.1 by the CNIPA dated Oct. 15, 2018, with an English translation thereof.
Search Report appended to an Office Action, which was issued to Chinese counterpart application No. 201510446333.1 by the CNIPA dated May 29, 2019, with an English translation thereof.

* cited by examiner

*Primary Examiner* — Reginald Alexander
(74) *Attorney, Agent, or Firm* — Kirton McConkie; Evan R. Witt

(57) ABSTRACT

A coffee brewer for a coffee capsule includes a frame body, a holding mechanism and two reloading mechanisms. The holding mechanism includes a holding seat for holding the coffee capsule. Each of the reloading mechanisms includes a rack member having a wing portion and rotatable between a loading position and an unloading position, a pin member movable by the holding seat to rotate the rack member to the loading position, and a restoring spring resiliently biasing the rack member to rotate toward the unloading position.

16 Claims, 16 Drawing Sheets

COFFEE BREWER

CROSS-REFERENCE TO RELATED APPLICATION

This application claims priority of Chinese Patent Application No. 201510446333.1, filed on Jul. 27, 2015.

FIELD

The disclosure relates to a coffee brewer, and more particularly to a coffee brewer including a reloading mechanism.

BACKGROUND

Referring to FIGS. 1 to 3, Chinese Patent No. CN102753060B discloses a conventional coffee brewer 1 for brewing ground coffee beans packed in a coffee capsule 10. The coffee capsule 10 has a flange portion 101. The conventional coffee brewer 1 includes a frame body 11, a blocking member 12, a brewing seat 13 mounted on the frame body 11, a driving unit 15 for driving movement of the blocking member 12 relative to the brewing seat 13 in an action direction 14, and two holding mechanisms 16 respectively disposed at two opposite lateral sides of the blocking member 12. Each of the holding mechanisms 16 includes a holding arm 161 that has a holding portion 163 disposed in front of the blocking member 12 for holding the flange portion 101 of the coffee capsule 10, and a driving member 162 for driving movement of the holding arm 161 relative to the blocking member 12 in the action direction 14.

Referring to FIG. 2, in use, the blocking member 12 is initially spaced apart from the brewing seat 13, and the coffee capsule 10 is reclined against the blocking member 12 and the holding arms 161 of the holding mechanisms 6. Referring further to FIG. 3, then, the holding arms 161 are respectively driven by the driving members 162 of the holding mechanisms 6 to firmly hold the flange portion 101 of the coffee capsule 10 on a front end of the blocking member 12 with the holding portions 163 thereof. Finally, the driving unit 15 moves the blocking member 12 toward the brewing seat 13 so that the coffee capsule 10 is moved into the brewing seat 13 and is pierced by a pricking element 131 of the brewing seat 13 to be brewed. To remove the coffee capsule 10 from the blocking member 12, the driving unit 15 first moves the blocking member 12 away from the brewing seat 13 to separate the coffee capsule 10 from the brewing seat 13, and then the holding arms 161 are respectively driven by the driving members 162 to release the flange portion 101 of the coffee capsule 10, so as to permit the coffee capsule 10 to fall downwardly.

However, during the operation of the holding mechanisms 6 to firmly hold the flange portion 101 of the coffee capsule 10 on the blocking member 12, the coffee capsule 10 may not be accurately aligned with the brewing seat 13. Moreover, during removal of the coffee capsule 10 from the blocking member 12, the coffee capsule 10 may still recline against the blocking member 12 and the holding arms 161 of the holding mechanisms 6 when the flange portion 101 is released. A user may need to manually separate the coffee capsule 10 from the blocking member 12 in the high-temperature inner space of the conventional coffee brewer 1, thereby adversely affecting safety during use of the conventional coffee brewer 1.

SUMMARY

Therefore, an object of the disclosure is to provide a coffee brewer that can alleviate at least one of the drawbacks of the prior art.

According to the disclosure, the coffee brewer is for a coffee capsule, and includes a frame body, a holding mechanism and two reloading mechanisms. The frame body receives the coffee capsule. The holding mechanism is mounted to the frame body, and includes a holding seat that defines a holding space therein for holding the coffee capsule and that is movable relative to the frame body between a brewing position where the holding seat holds the coffee capsule therein, and a reloading position where the holding seat is separated from the coffee capsule, and a driving unit for driving the movement of the holding seat relative to the frame body. The reloading mechanisms are arranged in a lateral direction of the coffee brewer. Each of the reloading mechanisms includes a rack member that is rotatably mounted on the frame body, that has a wing portion, and that is rotatable relative to the frame body between a loading position and an unloading position, a pin member that is moved by the holding seat to push the rack member so as to rotate the rack member to the loading position when the holding seat is moved to the reloading position, and a restoring spring that resiliently biases the rack member to rotate toward the unloading position. A distance between the wing portions of the rack members of the reloading mechanisms when each of the rack members is at the loading position is smaller than that between the wing portions of the rack members when each of the rack members is at the unloading position.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
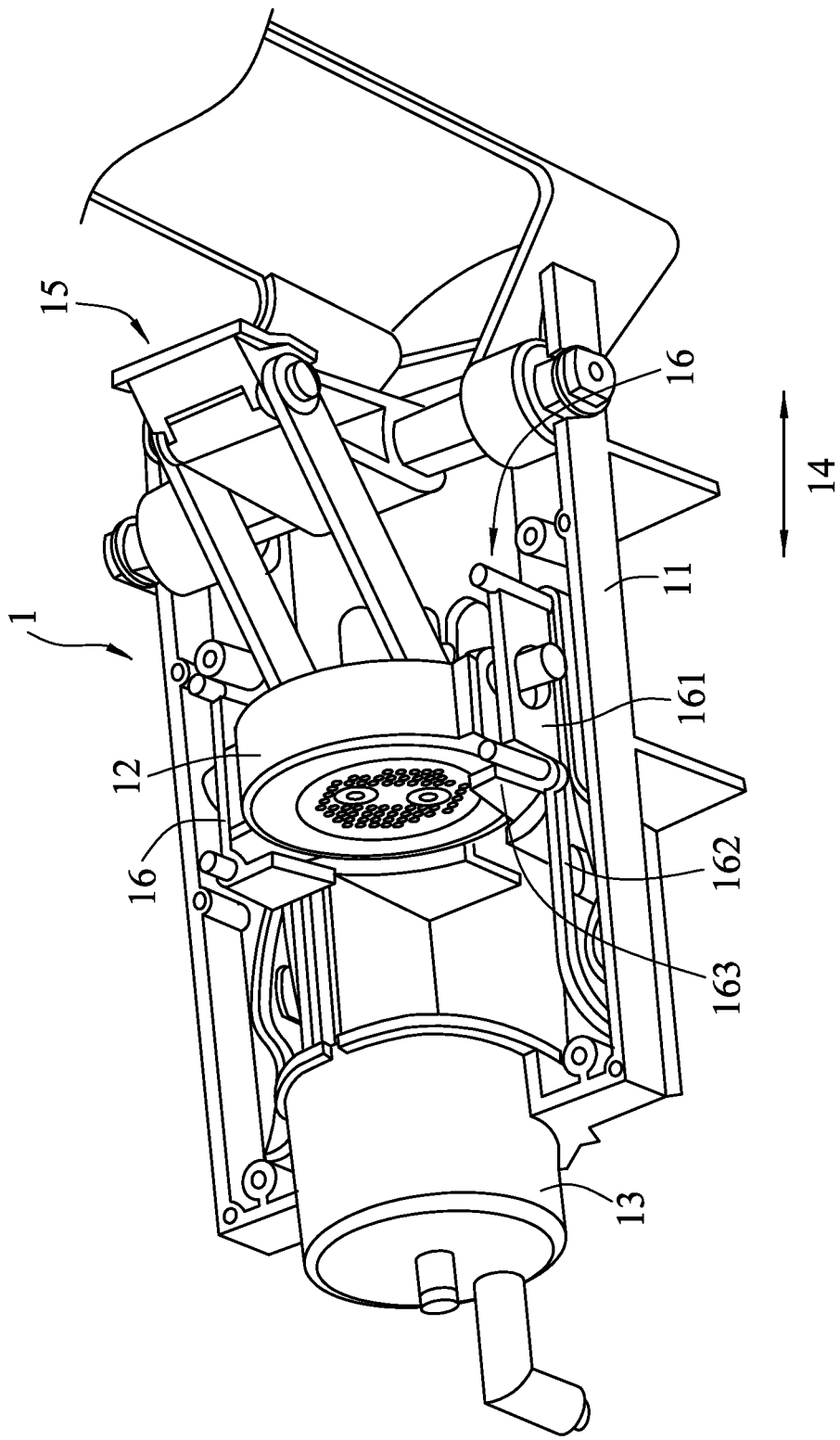
FIG. 1 is a fragmentary perspective view illustrating a conventional coffee brewer disclosed in Chinese Patent No. CN102753060B.
Figure 2:
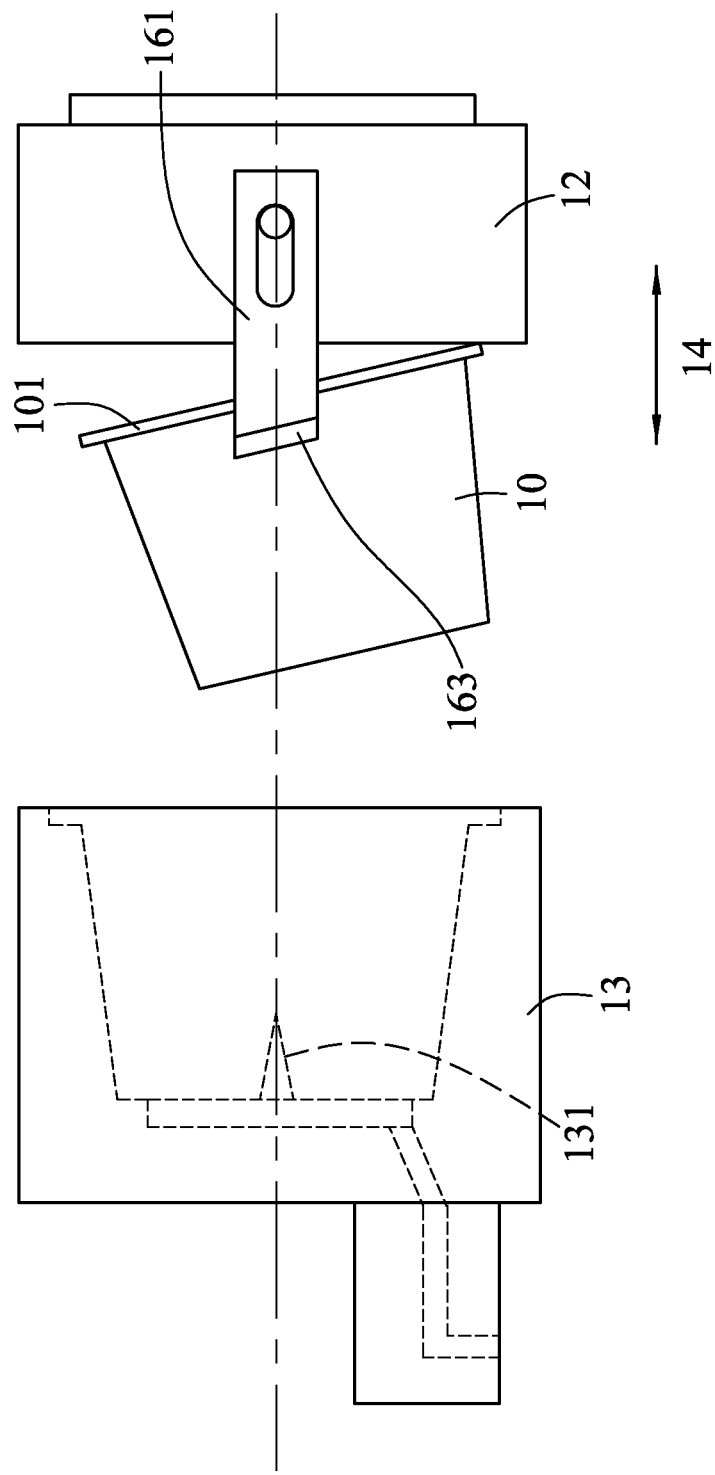
FIG. 2 is a schematic side view illustrating operation of the conventional coffee brewer.
Figure 3:
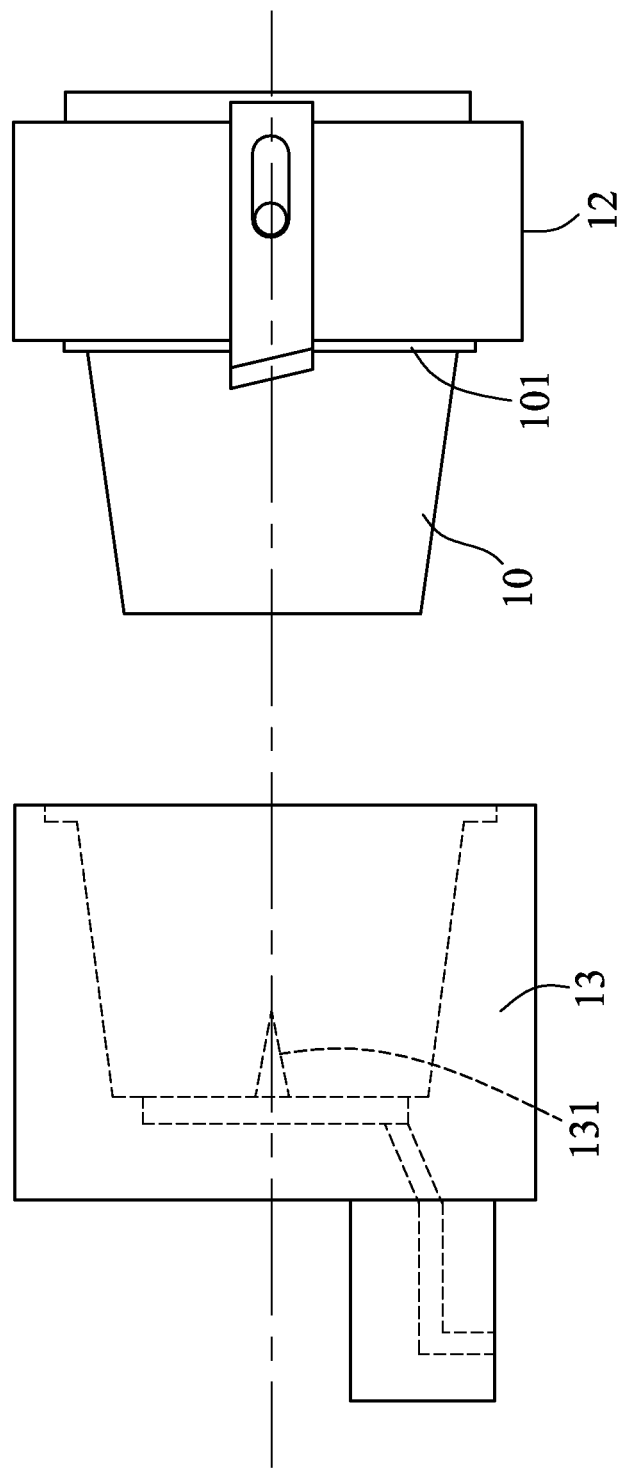
FIG. 3 is another schematic side view illustrating operation of the conventional coffee brewer.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4:
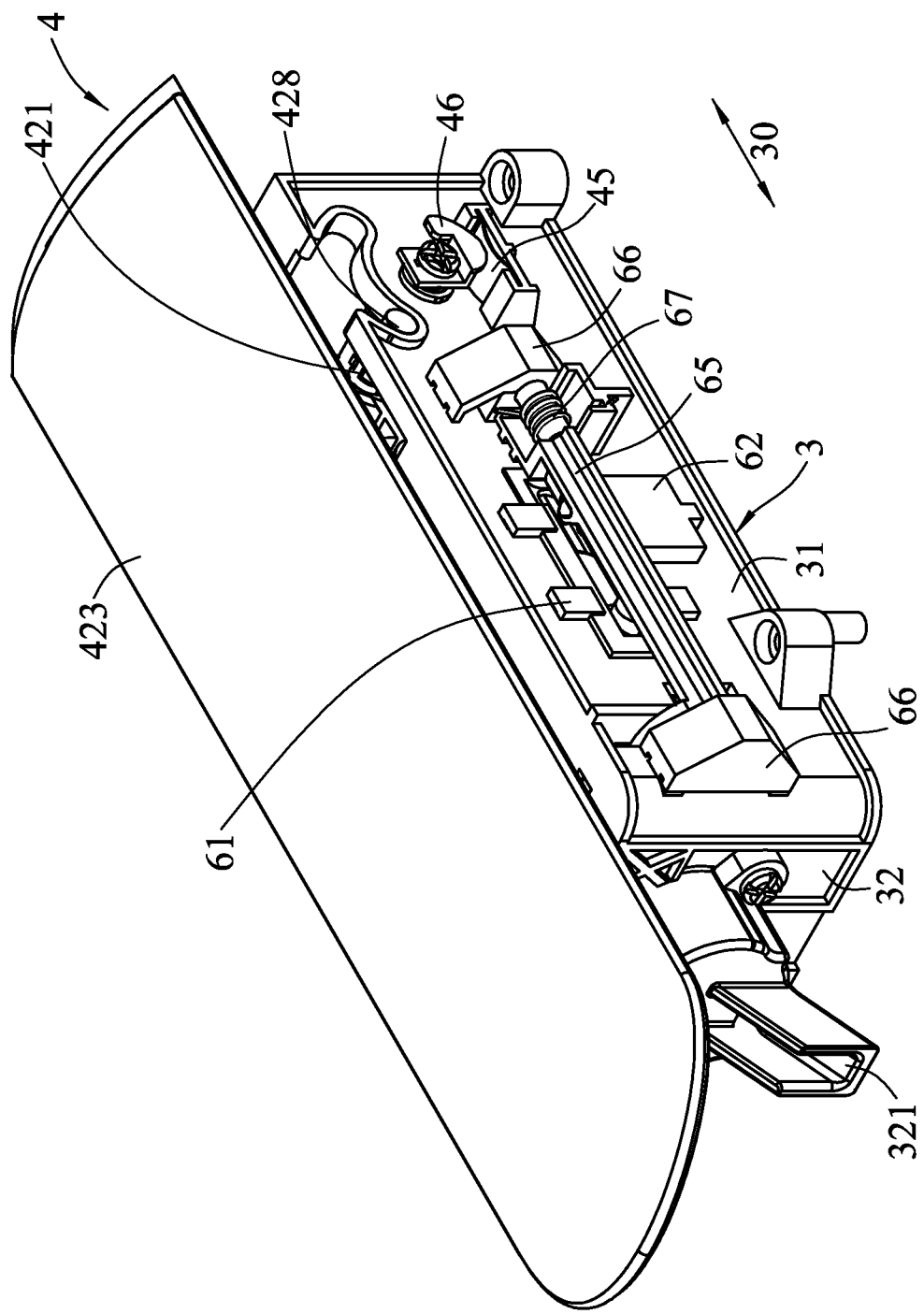
FIG. 4 is a perspective view illustrating a first embodiment of the coffee brewer according to the disclosure.
Figure 5:
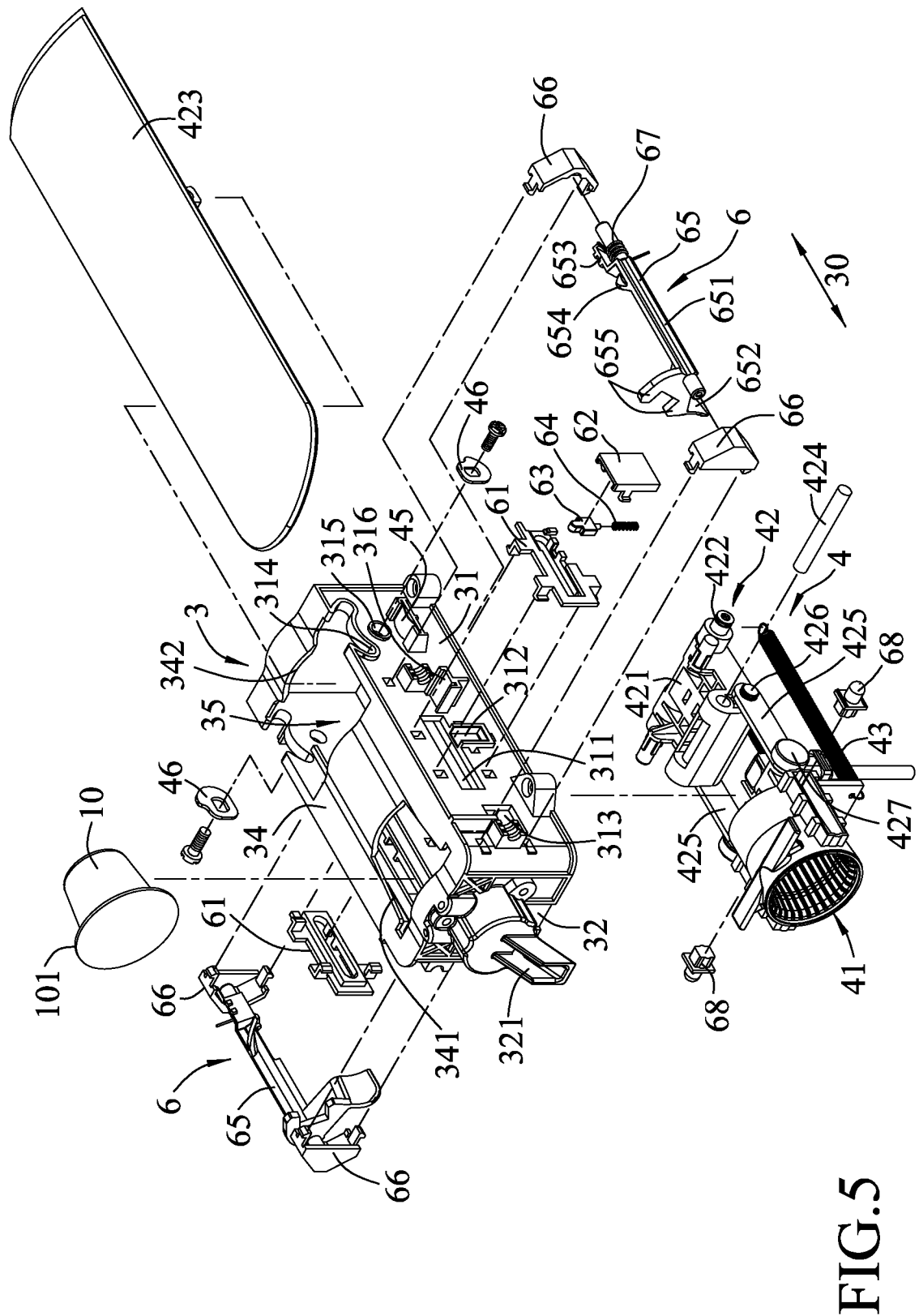
FIG. 5 is a partly exploded perspective view illustrating the first embodiment.
Figure 6:
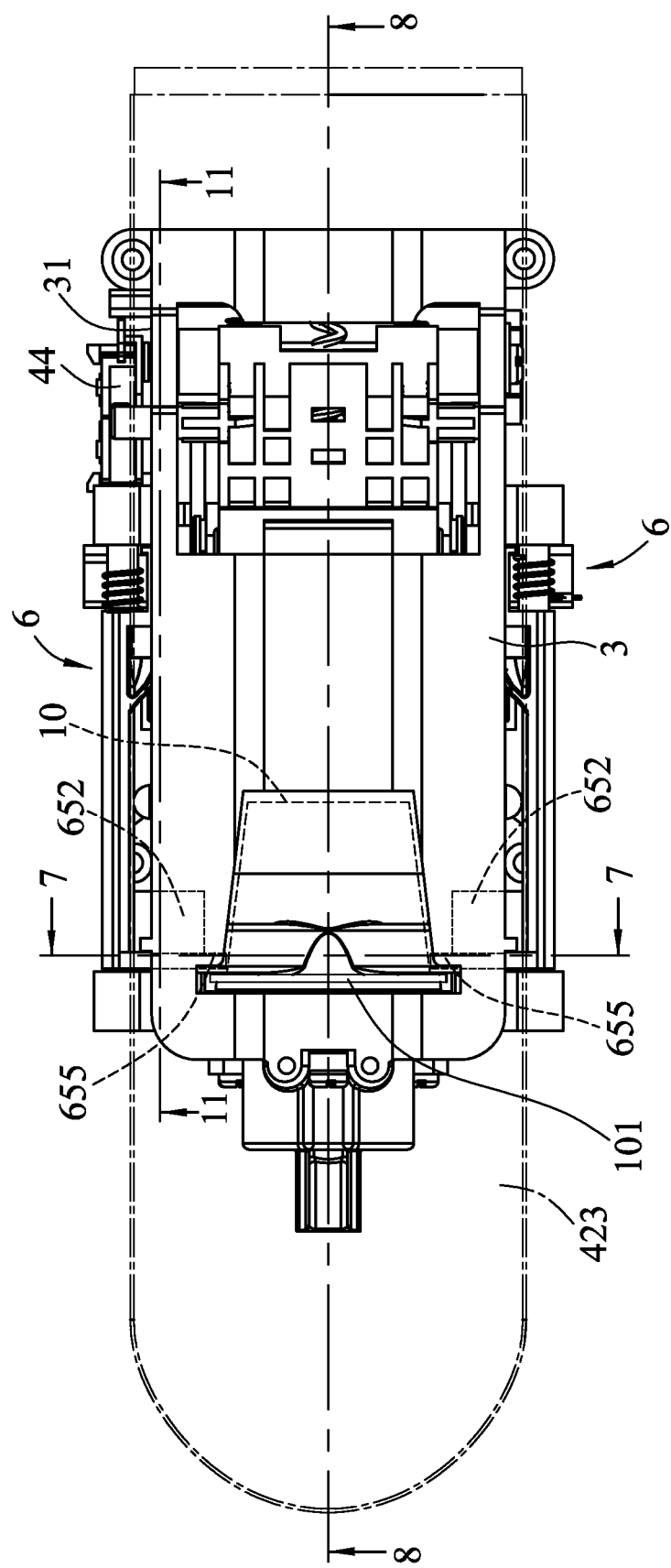
FIG. 6 is a schematic top view illustrating the first embodiment.

Referring to FIGS. 4 to 6, the first embodiment of the coffee brewer according to the disclosure is for brewing ground coffee beans packed in a coffee capsule 10. The coffee capsule 10 has a flange portion 101. The coffee brewer includes a frame body 3, a holding mechanism 4, a brewing unit 5 (see FIG. 8) and two reloading mechanisms 6.

Figure 7:
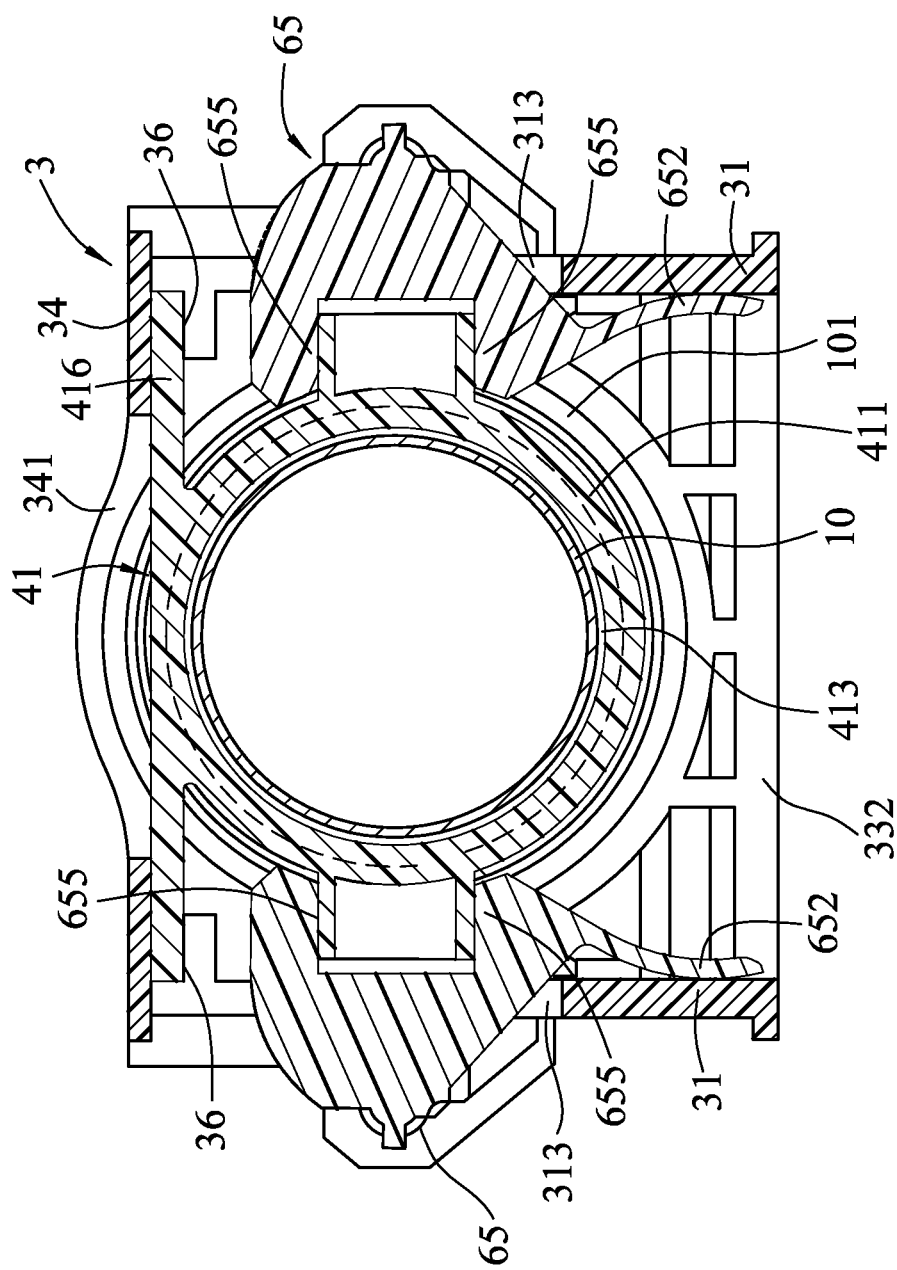
FIG. 7 is a schematic sectional view taken along line 7-7 in FIG. 6 and illustrating each of two rack members of the first embodiment being in an unloading position.
Figure 8:
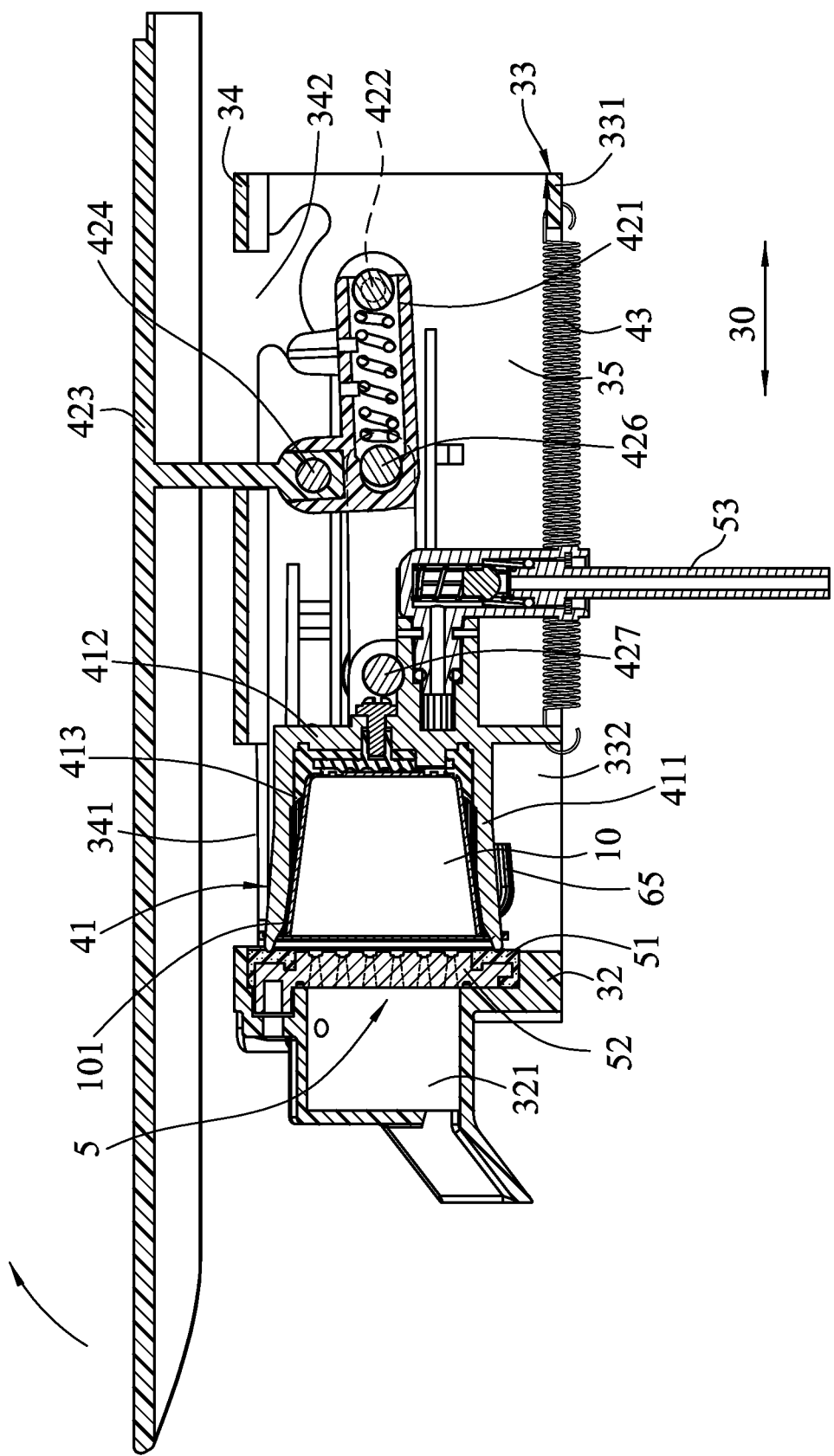
FIG. 8 is another schematic sectional view taken along line 8-8 in FIG. 6 and illustrating a holding seat of the first embodiment being in a brewing position.

Referring further to FIGS. 7 and 8, the frame body 3 includes two lateral walls 31 that are spaced apart from each other in a lateral direction, a front wall 32 that interconnects front edges of the lateral walls 31, a bottom wall 33 (see FIG. 8) that interconnects bottom edges of the lateral walls 31, a top wall 34 that interconnects top edges of the lateral walls 31, and a retaining space 35 that is defined among the lateral walls 31, the front wall 32, the bottom wall 33 and the top wall 34.

Each of the lateral walls 31 has a first through groove 311 that substantially extends in a front-rear direction perpendicular to the lateral direction, an installation groove 312 that extends in a top-bottom direction perpendicular to the lateral direction and the front-rear direction and that is in spatial communication with the first through groove 311, a through hole 313 that is proximate to the front wall 32, a first axle hole 315 that is formed in a rear portion the lateral wall 31, and a positioning groove 314 that is formed above the first axle hole 315 and through the top edge of the lateral wall 31. Each of the lateral walls 31 further has a first abutment block 316 that protrudes away from the other one of said lateral walls 31 and that is disposed adjacent to a rear portion of the first through groove 311.

The front wall 32 is formed with an outlet passage 321 for exit of brewed coffee. The bottom wall 33 has a rear segment 331 that is disposed adjacent to rear ends of the lateral walls 31, and an unloading opening 332 that is disposed adjacent to the front wall 32 and that is in spatial communication with the retaining space 35. The top wall 34 has a loading opening 341 that corresponds in shape to the coffee capsule 10, that is disposed adjacent to the front wall 32, and that is in spatial communication with the retaining space 35, and a communication opening 342 that is disposed adjacent to the rear ends of the lateral walls 31. The frame body 3 further includes two spaced-apart guiding grooves 36 (see FIG. 7) each disposed under the top wall 34 and extending in an action direction 30. In this embodiment, the action direction 30 is the front-rear direction.

Referring to FIGS. 5, 8, 9 and 10, the holding mechanism 4 includes a holding seat 41 movable relative to the frame body 3 in the action direction 30 for holding the coffee capsule 10, a driving unit 42 for driving movement of the holding seat 41, two extension springs 43 connected between the holding seat 41 and the rear segment 331 of the bottom wall 33, and a micro switch (see FIG. 9) disposed on the frame body 3.

Figure 9:
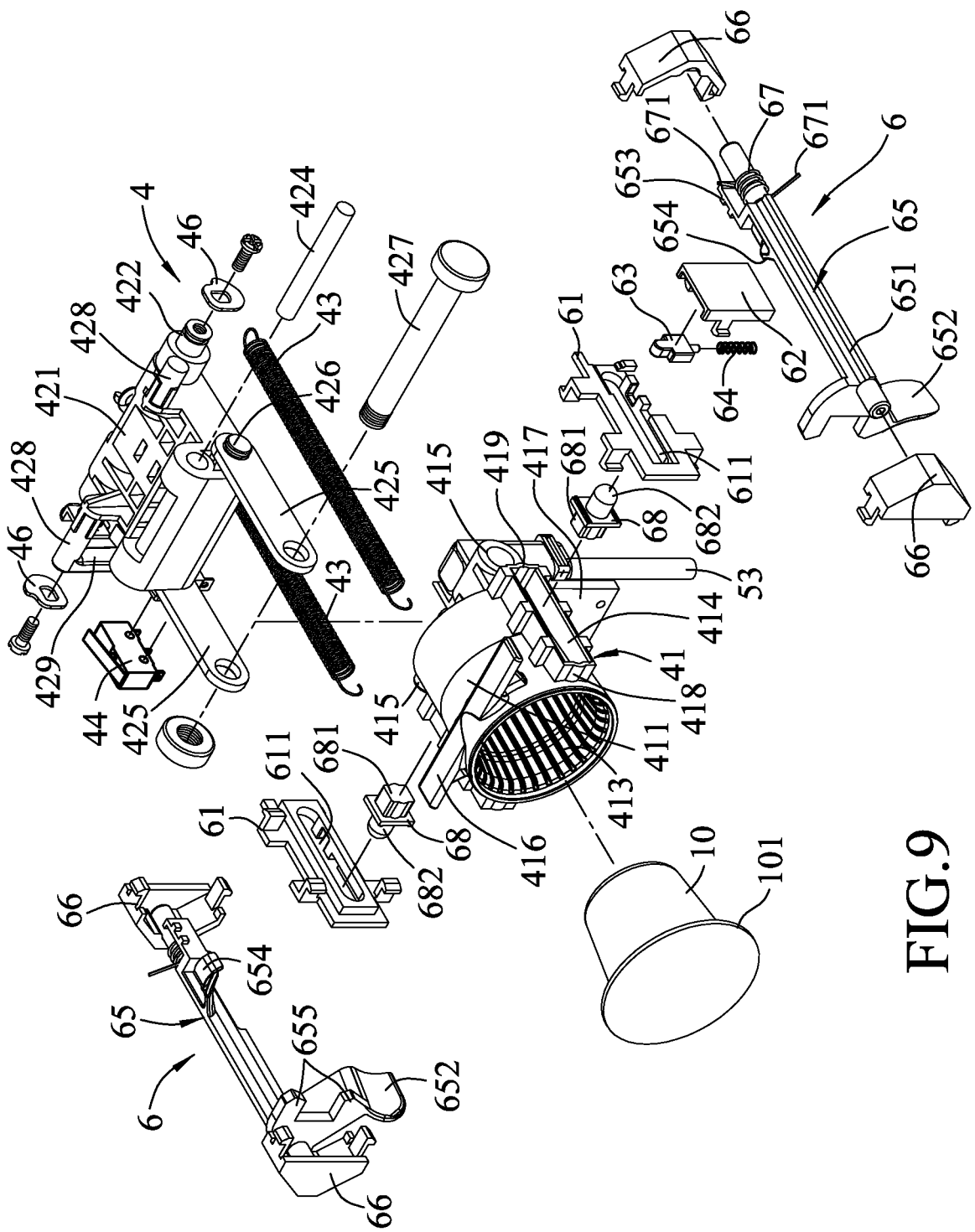
FIG. 9 is a partly exploded perspective view illustrating a holding mechanism and two reloading mechanisms of the first embodiment.

The holding seat 41 has a base wall 412, a surrounding wall 411 that extends forwardly from a periphery of the base wall 412 and that cooperates with the base wall 412 to define a holding space 413, two slide grooves 414 that are formed in said surrounding wall 411 and that open away from each other in the lateral direction, two tube portions 415 (see FIG. 9) that are co-movably connected to the base wall 412 and that are aligned with each other in the lateral direction, a guide plate 416 (see FIG. 9) that is co-movably connected to a top end of the surrounding wall 411 and that extends in the lateral direction, and a pull plate 417 (see FIG. 9) that is co-movably connected to the base wall 412 and that extends downwardly from the base wall 412. Two opposite end portions of the guide plate 416 engage respectively and slidably the guiding grooves 36 (see FIG. 7) so as to limit the movement of the holding seat 41 relative to the frame body 3 in the action direction 30. The extension springs 43 are spaced apart from each other in the lateral direction and each have two opposite ends connected respectively to the pull plate 417 of the holding seat 41 and the rear segment 331 of the bottom wall 33 for resiliently biasing the holding seat 41 toward the rear segment 331 of the bottom wall 33. The holding seat 41 further has two front wall segments 418 (only one is shown in FIG. 9) that define respectively frond ends of the slide grooves 414, and two rear wall segments 419 (only one is shown in FIG. 9) that define respectively rear ends of the slide grooves 414.

In one embodiment, the micro switch 44 is connected to an outer surface of one of the lateral walls 31 of the frame body 3 (see FIG. 6).

The driving unit 42 includes a first swing seat 421 that is substantially mounted in the retaining space 35 and that corresponds in position to the communication opening 342, two first pivot axles 422 (only one is visible in FIG. 5) that respectively extend through the first axle holes 315 of the lateral walls 31 to pivotally interconnect the first swing seat 421 and the frame body 3, an operating member 423 that is connected to the first swing seat 421 by a second pivot axle 424, two swing arms 425 that are spaced apart from each other in the lateral direction and that are pivotally connected to the first swing seat 421 by a third pivot axle 426, and a fourth pivot axle 427 that extends through the swing arms 425 and the tube portions 415 of the holding seat 41 to pivotally interconnect the holding seat 41 and the swing arms 425.

The first swing seat 421 has two positioning axles 428 that project away from each other in the lateral direction and that respectively and slidably engage the positioning grooves 314 in the lateral walls 31, and a press lever 429 (see FIG. 9) that is connected to a distal end of one of the positioning axles 428 for depression of the micro switch 44. The holding mechanism further includes two spring plates 45 that are respectively disposed on outer surfaces of the lateral walls 31 of the frame body 3 (only one is shown in FIG. 5), and two friction members 46 that are configured as two friction plates, that are respectively mounted on the first pivot axles 422, and that are co-rotatable with the first swing seat 421 for respectively being in frictional contact with the spring plates 45.

In this embodiment, the brewing unit 5 (see FIG. 8) includes a sealing ring 51 that is disposed on the front wall 32 of the frame body 3 and that corresponds in position to the outlet passage 321, a porous plate member 52 that is mounted on the sealing ring 51 and that is formed with a plurality of through holes, and an inlet tube assembly 53 that is disposed on a rear end of the holding seat 41 for introducing water into the holding space 413 in the holding seat 41.

In this embodiment, the reloading mechanisms 6 are bilaterally symmetric and are respectively mounted to the lateral walls 31 of the frame body 3. For the sake of brevity, only one of the reloading mechanisms 6 is described in the following paragraphs. The reloading mechanism 6 includes a fixing plate 61 that is mounted to the outer surface of the corresponding lateral wall 31, a cap member 62 that covers the installation groove 312 in the corresponding lateral wall 31, a restricting member 63 that has a rounded head and that is mounted to and movable along the installation groove 312 in the corresponding lateral wall 31, and a restricting resilient member 64 for resiliently biasing the restricting member 63 to move upwardly. The fixing plate 61 is formed with a second through groove 611 that corresponds in position to and is substantially registered with the first through groove 311 in the corresponding lateral wall 31.

The reloading mechanism 6 further includes a rack member 65, two retaining members 66 for rotatably mounting the rack member 65 to the corresponding lateral wall 31, a restoring spring 67 that is sleeved on the rack member 65, and a pin member 68 that extends through and is movable along the first through groove 311 in the corresponding lateral wall 31 and the second through groove 611 in the fixing plate 61.

The rack member 65 has a rod portion 651 that has opposite ends respectively held by the retaining members 66, a wing portion 652 that projects from the rod portion 651 and that corresponds in position to the unloading opening 332 and the loading opening 341, a second abutment block 653 that projects from the rod portion 651 and that is disposed adjacent to the first abutment block 316 of the corresponding lateral wall 31, an abutment surface 654 that is disposed adjacent to a rear end of the second through groove 611 in the corresponding fixing plate 61, and two hindering projections 655 that are disposed adjacent to the front wall 32 of the frame body 3.

The restoring spring 67 is sleeved on the rod portion 651 of the rack member 65, and has two end sections 671 (see FIG. 9) that respectively abut against the first abutment block 316 of the corresponding lateral wall 31 and the second abutment block 653 of the rack member 65.

The pin member 68 has a driven section 681 (see FIG. 9) that slidably engages a respective one of the slide grooves 414 in the holding seat 41, and a pushing section 682 (see FIG. 9) that projects out of the second through groove 611 in the fixing plate 61 for pushing the abutment surface 654 of the rack member 65. In this embodiment, the driven section 681 of the pin member 68 is non-rotatable relative to the corresponding slide groove 414.

Figure 12:
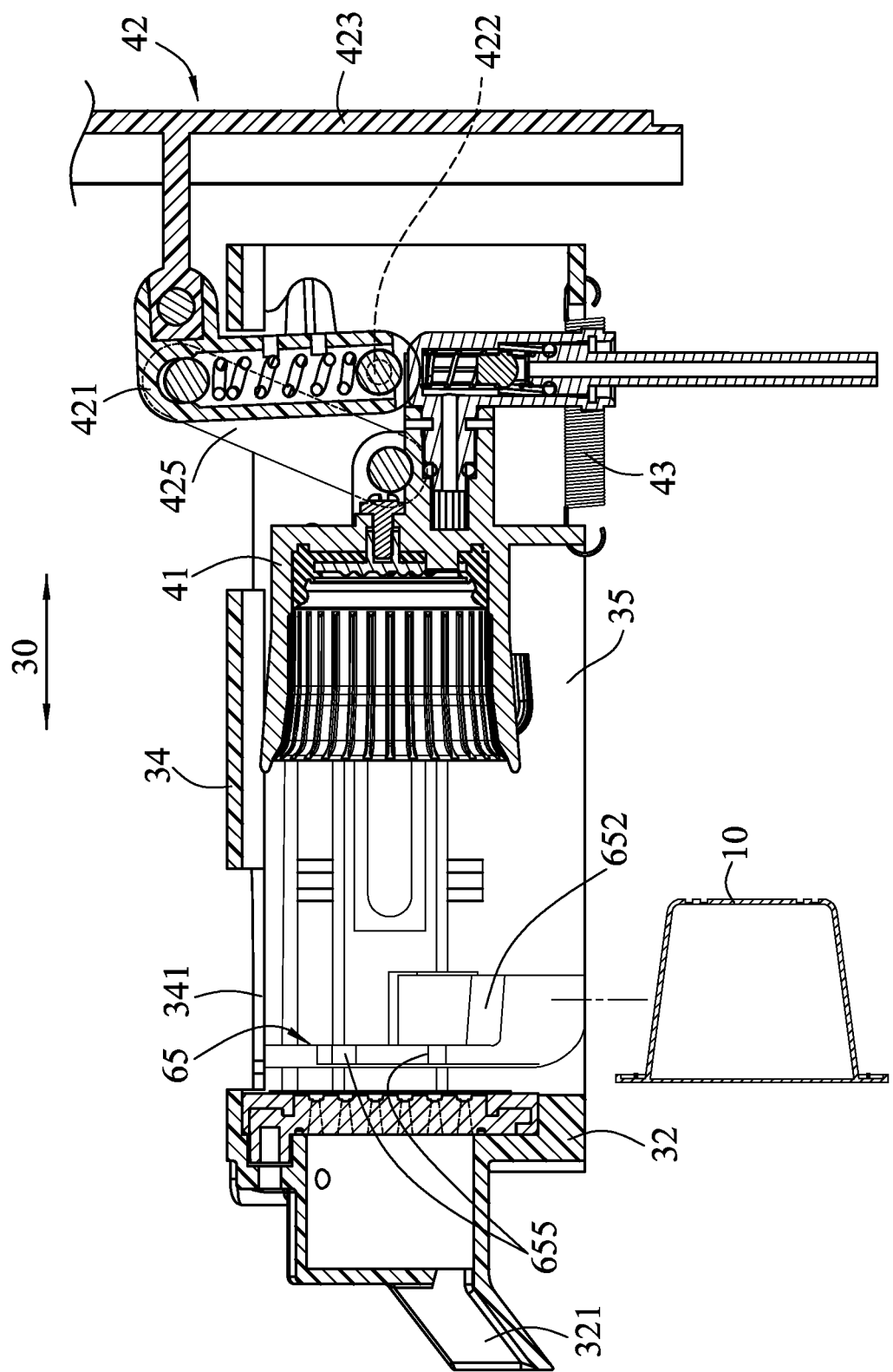
FIG. 12 is still another schematic sectional view similar to FIG. 8 and illustrating the holding seat being in a reloading position.
Figure 13:
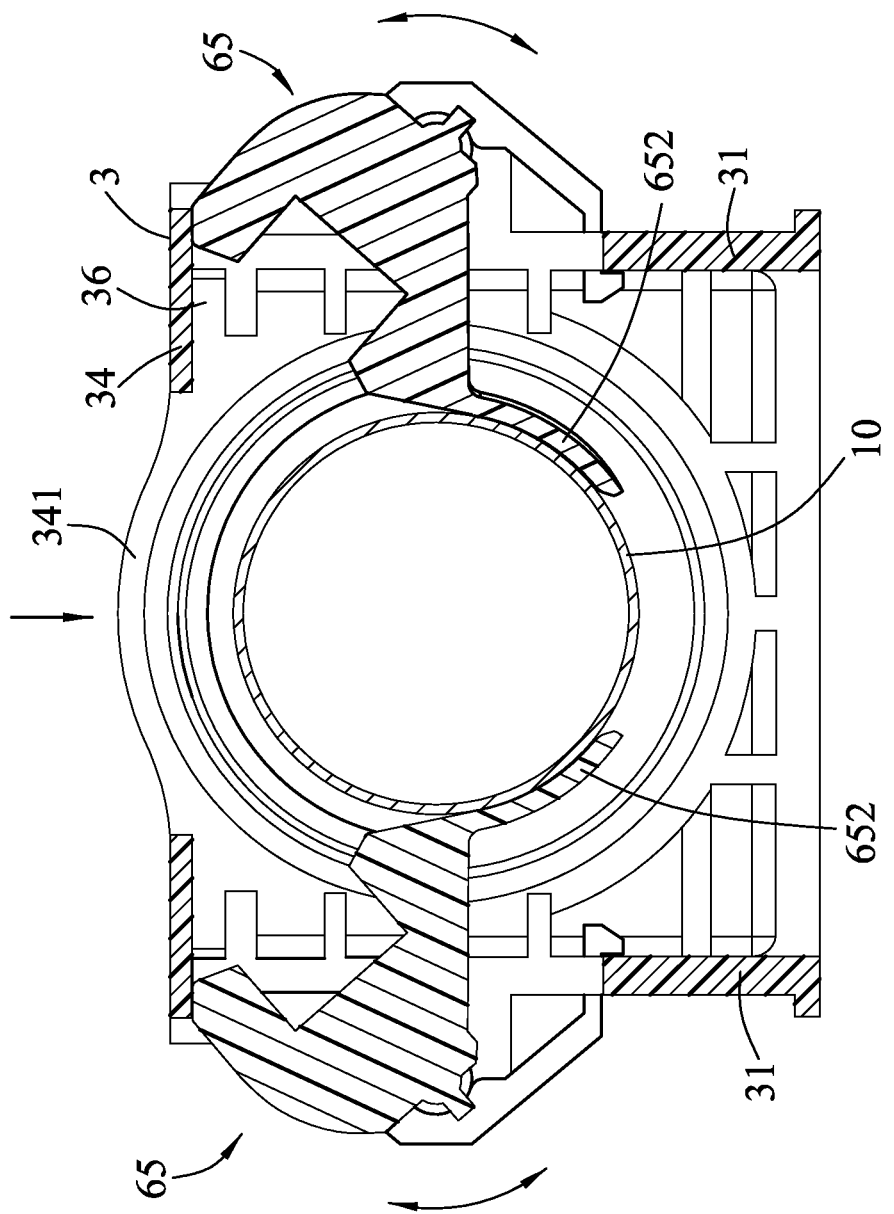
FIG. 13 is still another schematic sectional view similar to FIG. 7 and illustrating each of the rack members being in a loading position.

The holding seat 41 is movable in the action direction 30 relative to the frame body 3 between a brewing position (see FIG. 8) and a reloading position (see FIG. 12). The rack member 65 of each of the reloading mechanisms 6 is rotatable about the rod portion 651 thereof relative to the frame body 3 between an unloading position (see FIG. 7) and a loading position (see FIG. 13).

Referring to FIGS. 7, 8, 10 and 11, when the holding seat 41 is at the brewing position and holds the coffee capsule 10 therein, the operating member 423 is substantially horizontal, and the press lever 429 of the first swing seat 421 depresses the micro switch 44 so that the brewing unit 5 is actuated to brew the ground coffee beans in the coffee capsule 10. At this time, the holding seat 41 pushes the coffee capsule 10 against the sealing ring 51 of the brewing unit 5, the driven section 681 of the pin member 68 of each of the reloading mechanisms 6 is located at the rear end of the corresponding slide groove 414 (see FIG. 11), the pushing section 682 of the pin member 68 of each of the reloading mechanisms 6 is located at a front end of the second through groove 611 in the corresponding fixing plate 61 (see FIG. 11), the extension springs 43 are stretched to generate a restoring force, and the rack member 65 of each of the reloading mechanisms 6 is maintained at the unloading position by the restoring spring 67 of the reloading mechanism 6, such that a distance between the wing portions 652 of the rack members 65 of the reloading mechanisms 6 is greater than the diameter of a held portion of the coffee capsule 10, and the hindering projections 655 of the rack member 65 of each of the reloading mechanism 6 are located immediately behind the flange portion 101 of the coffee capsule 10.

Figure 10:
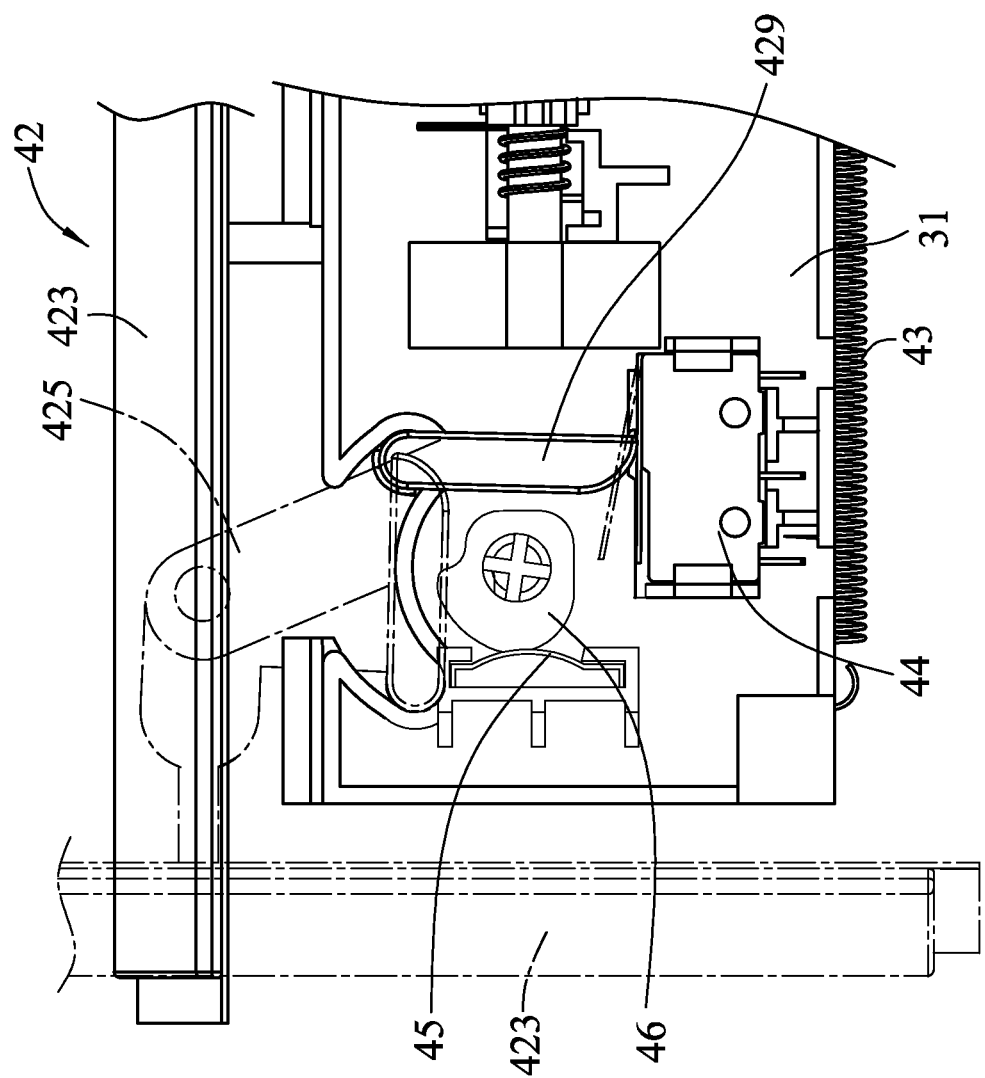
FIG. 10 is a schematic fragmentary side view illustrating a friction member of the first embodiment.
Figure 11:
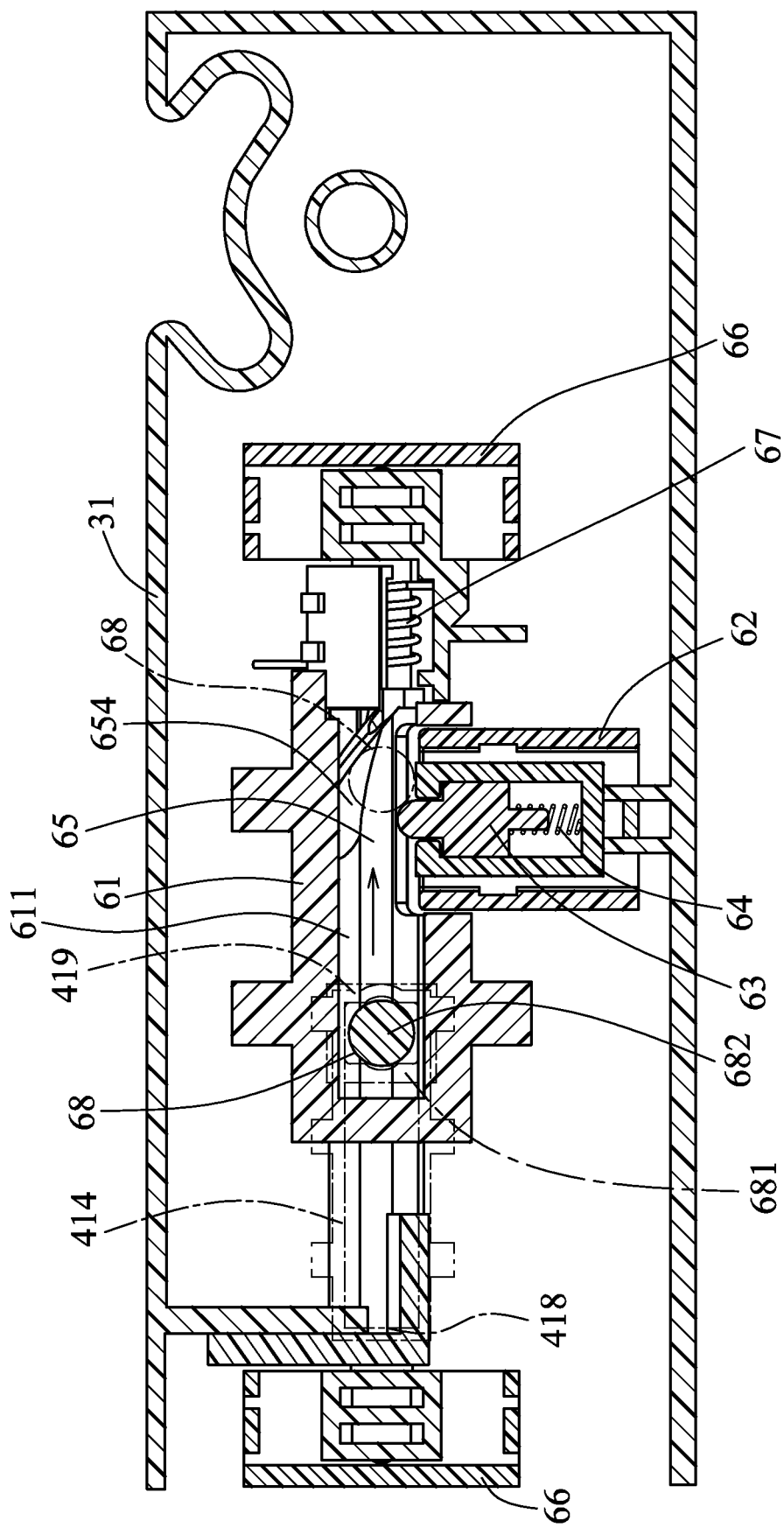
FIG. 11 is still another schematic sectional view taken along line 11-11 in FIG. 6 and illustrating a pin member of the first embodiment.

To reload the coffee brewer with a new coffee capsule 10, the operating member 423 is pulled upwardly and rearwardly to rotate the first swing seat 421 so as to move the holding seat 41 to the reloading position via the swing arms 425. The restoring force generated by the extension springs 43 aids the movement of the holding seat 41 from the brewing position to the reloading position. The engagement among the end portions of the guide plate 416 and the guiding grooves 36 limits the holding seat 41 to move in the action direction 30 at the early stage of the movement of the holding seat 41 from the brewing position to the reloading position. Each of the friction members 46 co-rotates with the first swing seat 421 relative to the corresponding spring plate 45. Referring to FIG. 10, in this embodiment, the friction members 46 are shaped such that, frictional contact between the friction members 46 and the resilient friction plates 45 are maintained until an elevation angle of the operating member 423 is greater than 60 degrees, so that the movement of the holding seat 41 is retarded when the elevation angle of the operating member 423 is smaller than 60 degrees. Moreover, the rotation of the first swing seat 421 at the early stage of the movement of the holding seat 41 from the brewing position to the reloading position also separates the press lever 429 of the first swing seat 421 from the micro switch 44 so that the brewing unit 5 is shut down.

It should be noted that, at the early stage of the movement of the holding seat 41 from the brewing position to the reloading position, the rack member 65 of each of the reloading mechanisms 6 is maintained at the unloading position by the restoring spring 67 of the reloading mechanism 6, so that the hindering projections 655 of the rack member 65 of each of the reloading mechanisms 6 prevent movement of the used coffee capsule 10 away from the front wall 32 of the frame body 3, and that the used coffee capsule 10 is separated from the holding seat 41 and falls out of the coffee brewer via the unloading opening 332.

Referring to FIGS. 10 to 13, at the late stage of the movement of the holding seat 41 from the brewing position to the reloading position, the front wall segments 418 of the holding seat 41 respectively urge the pin members 68 of the reloading mechanisms 6 to rear ends of the second through grooves 611, so that the pushing sections 682 of the pin members 68 respectively push the abutment surfaces 654 of the rack members 65 so as to rotate the rack members 65 to the loading position (see FIG. 13) against the biasing action of the restoring springs 67. At this time, the wing portions 652 of the rack members 65 are positioned to support the new coffee capsule 10 when the new coffee capsule 10 is placed into the coffee brewer via the loading opening 341. The rounded ends of the restricting members 63 are respectively biased into the second through grooves 611 by the restricting resilient members 64 to respectively prevent the pushing sections 682 of the pin members 68 to respectively move away from the rear ends of the second through grooves 611, so that the rack members 65 are maintained at the loading position.

Conversely, the operating member 423 can be pushed forwardly and downwardly to move the holding seat 41 from the reloading position to the brewing position such that the new coffee capsule 10 is held within the holding seat 41 (i.e., in the holding space 413). At the early stage of the movement of the holding seat 41 from the reloading position to the brewing position, the pin members 68 are respectively restricted at the rear ends of the second through grooves 611 by the restricting members 63 to maintain the rack members 65 at the loading position, and the slide grooves 414 respectively move relative to the pin members 68 until the rear wall segments 419 of the holding seat 41 are respectively in contact with the driven sections 681 of the pin members 68. With further movement of the holding seat 41 toward the brewing position after the contact between the driven section 681 of each of the pin members 68 and the corresponding rear wall segment 419 of the holding seat 41, the rear wall segments 419 respectively urge the pin members 68 to respectively push the restricting members 63 away from the second through grooves 611 against the biasing action of the restricting resilient members 64 to thereby allow the pin members 68 to move away from the rear ends of the second through grooves 611, so that the pushing sections 682 of the pin members 68 are respectively separated from the abutment surfaces 654 of the rack members 65, and that the rack members 65 are respectively rotated to the unloading position (see FIG. 7) by the restoring springs 67 to remove the wing portion 652 from a traveling path of the holding seat 41. When the first swing seat 421 is rotated by the operating member 423 to move the holding seat 41 to the brewing position so as to hold the new coffee capsule 10, the press lever 429 of the first swing seat 421 depresses the micro switch 44 again so that the brewing unit 5 is actuated to brew the ground coffee beans in the new coffee capsule 10.

In sum, by virtue of the cooperation among the reloading mechanisms 6 and the holding mechanism 4, the coffee capsule 10 is held steadily by the wing portions 652 of the reloading mechanisms 6 when the holding seat 41 is at the reloading position, and is prevented from moving rearwardly by the hindering projections 655 of the rack members 65 when the holding seat 41 is moved from the brewing position to the reloading position, so as to be certainly separated from the holding seat 41 and fall out of the coffee brewer via the unloading opening 332.

Figure 14:
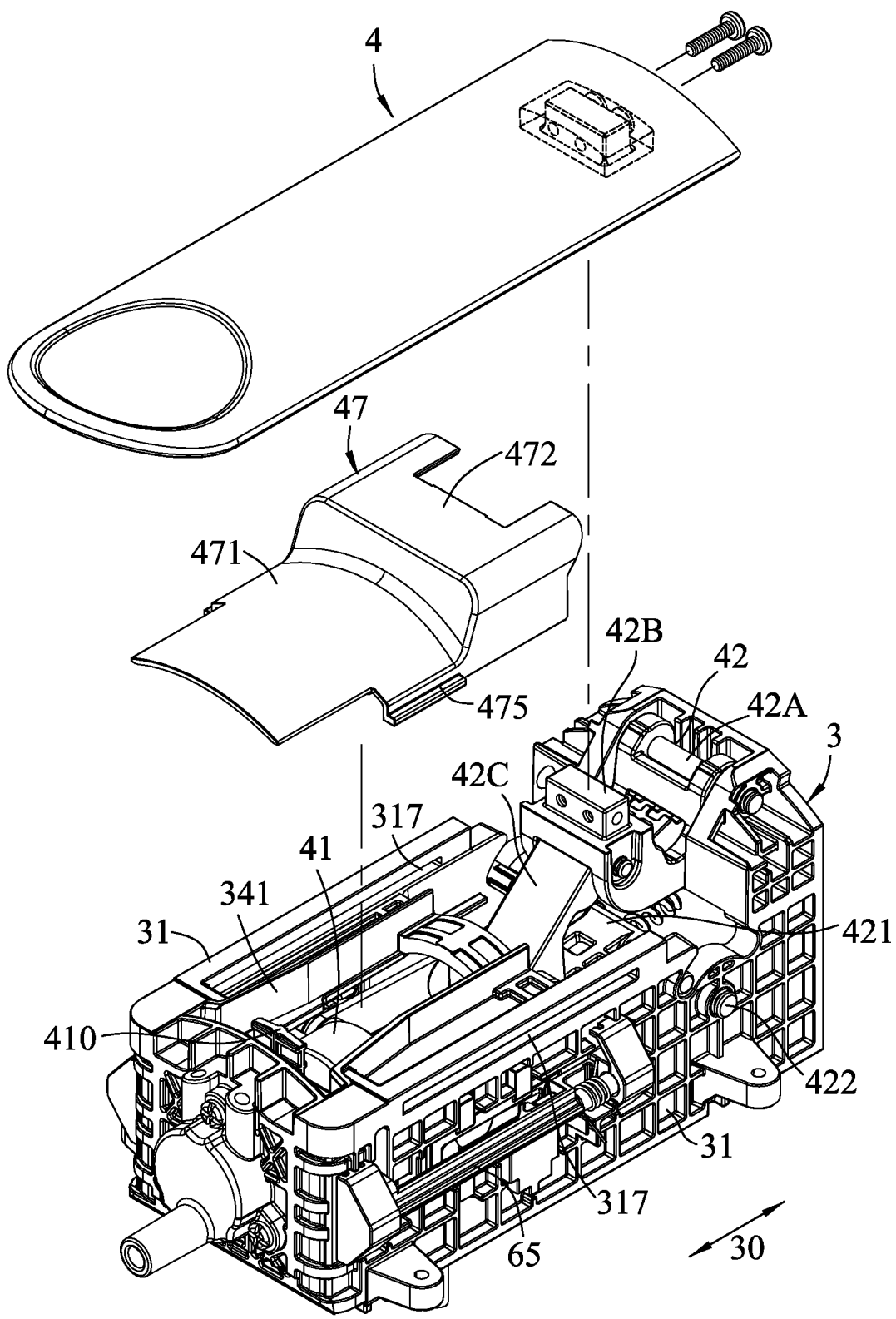
FIG. 14 is a partly exploded perspective view illustrating a second embodiment of the coffee brewer according to the disclosure.
Figure 15:
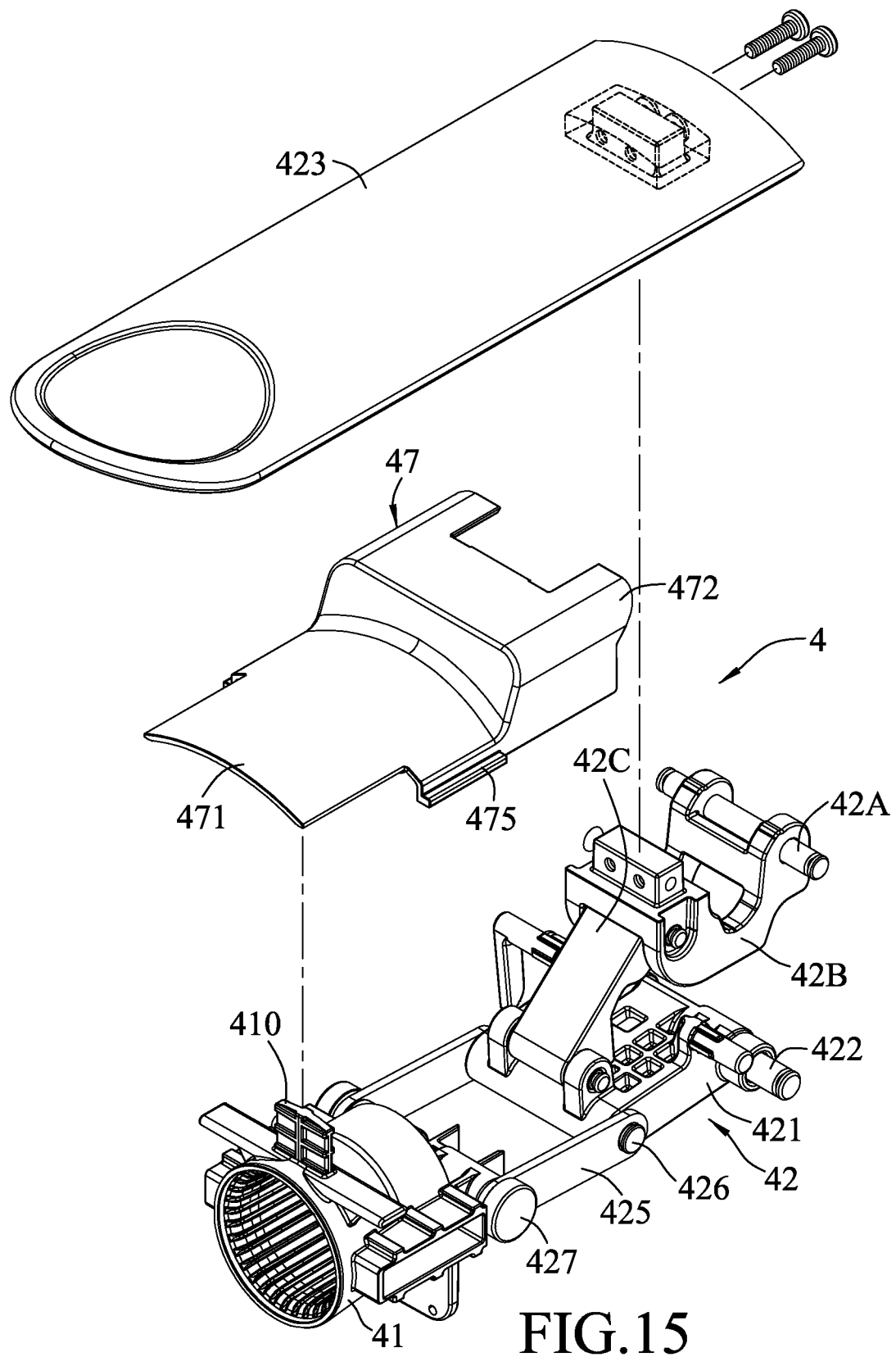
FIG. 15 is a partly exploded perspective view illustrating a holding mechanism of the second embodiment.
Figure 16:
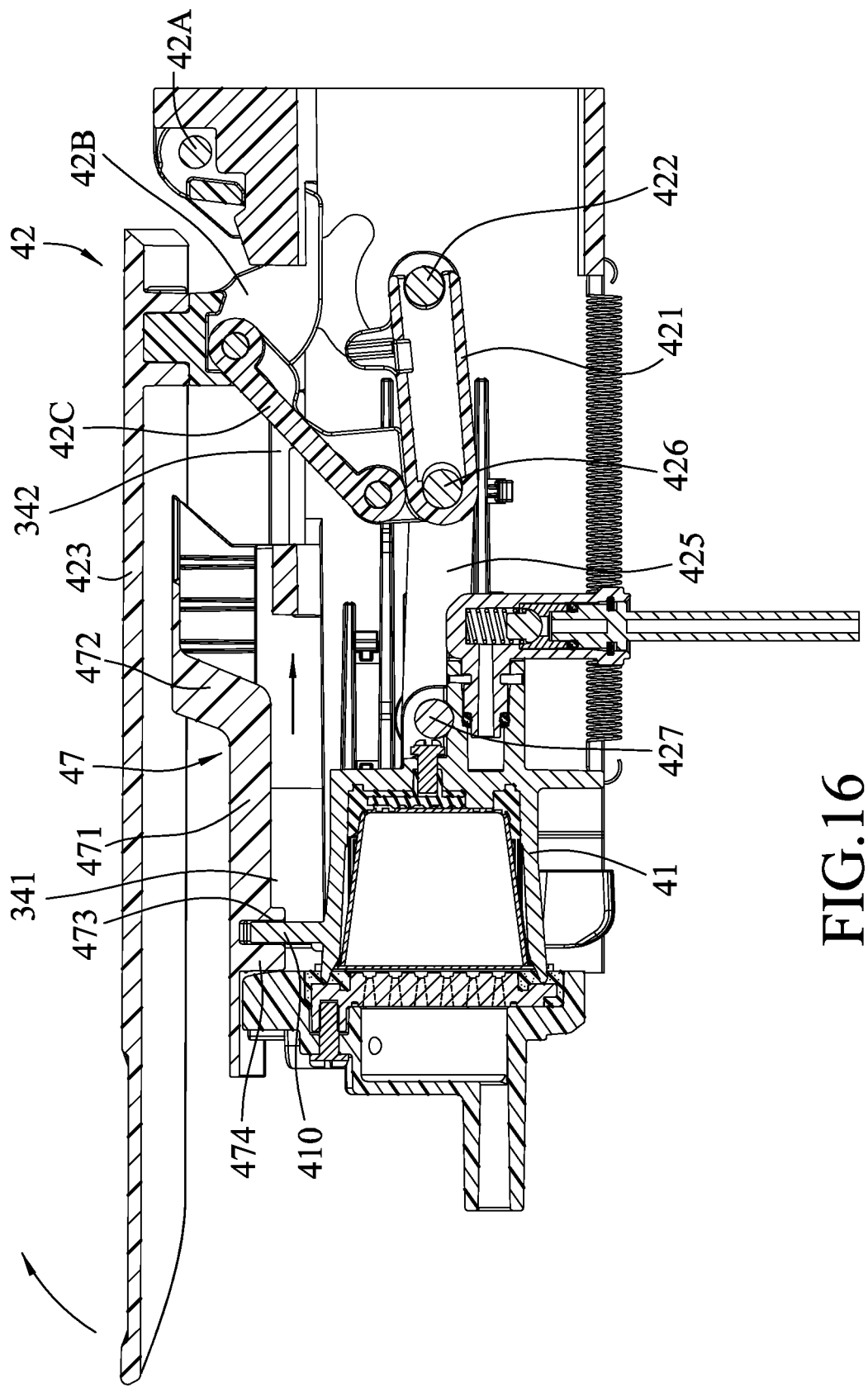
FIG. 16 is a schematic sectional view illustrating a holding seat of the second embodiment being in a brewing position.

Referring to FIGS. 14 to 16, the second embodiment of the coffee brewer according to the disclosure is similar to the first embodiment. Each of the lateral walls 31 of the frame body 3 of the second embodiment is formed with a cover guiding groove 317 that extends in the action direction 30. The cover guiding grooves 317 in the lateral walls 31 are respectively located at two opposite lateral sides of the loading opening 341.

The holding mechanism 4 of the second embodiment includes a holding seat 41, a driving unit 42 for driving movement of the holding seat 41 in the action direction 30, and a cover member 47 that is driven to move in the action direction 30 by the holding seat 41.

The driving unit 42 includes a first swing seat 421 that is rotatably mounted to the frame body 3 by a first pivot axle 422, two swing arms 425 that are spaced apart from each other in the lateral direction and that are pivotally connected to the first swing seat 421 by a second pivot axle 426, a third pivot axle 427 that pivotally interconnects the holding seat 41 and the swing arms 425, a second swing seat 42B that is rotatably mounted to the frame body 3 by a fourth pivot axle 42A, a link member 42C that is pivotally connected between the first and second swing seats 421, 42B, and an operating member 423 that is co-movably connected to the second swing seat 42B. The operating member 423 of the second embodiment is configured to occupy a relatively small space behind the frame body 3 when the holding seat 41 is moved to the reloading position.

The cover member 47 has a front segment 471 that is arc-shaped in cross-section, a rear segment 472 that is connected to the front segment 471 and that is U-shaped in cross-section, a protrusion 474 that protrudes downwardly from a bottom surface of the front segment 471 and that is formed with an insertion groove 473, and two guide wall segments 475 that are respectively disposed on two opposite lateral portions of the front segment 471 and that respectively and slidably engage the cover guiding grooves 317 in the lateral walls 31. The holding seat 41 has a connecting wall section 410 that projects upwardly and that is inserted into the insertion groove 473 in the protrusion 474.

When the holding seat 41 is at the brewing position (see FIG. 16), the operating member 423 is substantially horizontal, and the front segment 471 of the cover member 47 covers the loading opening 341. When the operating member 423 is pulled upwardly and rearwardly to move the holding seat 41 from the brewing position to the reloading position, the cover 47 is moved by the holding seat 41 such that the rear segment 472 substantially covers the communication opening 342, and the front segment 471 is removed from the loading opening 341. As such, a new coffee capsule 10 is prevented from being placed into the retaining space 35 before a used coffee capsule 10 falls out of the coffee brewer and before the rack members 65 of the reloading mechanisms 6 are rotated to the loading position.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A coffee brewer adapted for a coffee capsule, comprising:
   a frame body adapted to receive the coffee capsule;
   a holding mechanism mounted to said frame body, and including a holding seat that defines a holding space therein adapted for holding the coffee capsule and that is movable relative to said frame body between a brewing position where said holding seat holds the coffee capsule therein, and a reloading position where said holding seat is separated from the coffee capsule, and a driving unit for driving the movement of said holding seat relative to said frame body; and
   two reloading mechanisms arranged in a lateral direction of said coffee brewer, each of said reloading mechanisms including a rack member that is mounted on said frame body and that is rotatable relative to said frame body between a loading position and an unloading position, a pin member that is moved by said holding seat to push said rack member so as to rotate said rack member to the loading position when said holding seat is moved to the reloading position, and a restoring spring that is sleeved on said rack member and that resiliently biases said rack member to rotate toward the unloading position, said rack member of each of said reloading mechanisms having a wing portion that rotates along with the rotation of said rack member, wherein said wing portion extends from said rack member and is shaped to contact and support the coffee capsule in the loading position.

2. The coffee brewer as claimed in claim 1, wherein said holding seat moves relative to said frame body between the brewing position and the reloading position in an action direction, said holding seat having two slide grooves each of which extends in the action direction, said rack member of each of said reloading mechanisms further having an abutment surface, said pin member of each of said reloading mechanisms having a driven section that slidably engages a respective one of said slide grooves in said holding seat, and a pushing section for pushing said abutment surface of said rack member of said reloading mechanism such that, when said holding seat is moved from the brewing position to the reloading position, said holding seat moves said driven sections of said pin members of said reloading mechanisms to respectively press said pushing sections of said pin members against said abutment surfaces of said rack members of said reloading mechanisms, so as to rotate each of said rack members to the loading position, and when said holding seat is moved from the reloading position to the brewing position, said holding seat moves said driven sections of said pin members of said reloading mechanisms to respectively separate said pushing sections of said pin members from said abutment surfaces of said rack members of said reloading mechanisms, so that said rack members are respectively biased by said restoring springs of said reloading mechanisms to rotate to the unloading position.

3. The coffee brewer as claimed in claim 2, the coffee capsule having a flange portion, wherein said rack member of each of said reloading mechanisms further has at least one hindering projection that is located at one side of the flange portion in the action direction proximate to said holding seat when said holding seat is at the brewing position and when said rack members are at the unloading position.

4. The coffee brewer as claimed in claim 2, wherein said frame body has two lateral walls that are spaced apart from each other in the lateral direction, a bottom wall that interconnects bottom edges of said lateral walls, and a retaining space that is defined between said lateral walls and above said bottom wall for retaining the coffee capsule, said bottom wall having an unloading opening that is in spatial communication with said retaining space, the coffee capsule being permitted to fall out of said coffee brewer via said unloading opening.

5. The coffee brewer as claimed in claim 2, wherein said frame body has two lateral walls that are spaced apart from each other in the lateral direction, each of said lateral walls having a first abutment block that protrudes away from the other one of said lateral walls, said rack member of each of said reloading mechanisms further having a rod portion on which said abutment surface is formed, and a second abutment block that projects from said rod portion, said restoring spring of each of said reloading mechanisms being sleeved on said rod portion of said rack member of said reloading mechanism, and having two end sections that respectively abut against said first abutment block of a respective one of said lateral walls and said second abutment block of said rack member of said reloading mechanism.

6. The coffee brewer as claimed in claim 2, wherein the action direction is a front-rear direction of said coffee brewer and is perpendicular to the lateral direction, said frame body having two lateral walls that are spaced apart from each other in the lateral direction, each of said lateral walls having a first through groove that substantially extends in the front-rear direction, each of said reloading mechanisms further including a fixing plate that is mounted to a respective one of said lateral walls and that is formed with a second through groove substantially extending in the front-rear direction, corresponding in position to said first through groove in the corresponding one of said lateral walls, and permitting said pushing section of said pin member of said reloading mechanism to extend out of said frame body therethrough, a cap member that is mounted to the corresponding one of said lateral walls, a restricting member that is mounted between said cap member and the corresponding one of said lateral walls, and a restricting resilient member that resiliently biases said restricting member for preventing movement of said pin member of said reloading mechanism along said second through groove so as to prevent said pushing section of said pin member from being separated from said abutment surface of said rack member of said reloading mechanism.

7. The coffee brewer as claimed in claim 4, wherein said frame body further has a top wall that interconnects top edges of said lateral walls, and a front wall that interconnects front edges of said lateral walls, said top wall having a loading opening that is in spatial communication with said retaining space, said wing portions of said rack members extending into a space between said loading opening and said unloading opening for supporting the coffee capsule that is placed into said retaining space via said loading opening when said holding seat is moved to the reloading position to rotate said rack members to the loading position, said wing portions of said rack members being removed from the space between said loading opening and said unloading opening such that the coffee capsule falls out of said retaining space via said unloading opening when said rack members are at the unloading position and when said holding seat is moved away from the brewing position.

8. The coffee brewer as claimed in claim 7, wherein each of said lateral walls has a first axle hole, said driving unit including a first swing seat, at least one first pivot axle that extends through the first axle hole of one of said lateral walls to pivotally interconnect said first swing seat and said frame body, an operating member, a second pivot axle that interconnects said operating member and said first swing seat, at least one swing arm, a third pivot axle that pivotally interconnects said first swing seat and said swing arm, and a fourth pivot axle that pivotally interconnects said holding seat and said swing arm, said holding mechanism further including a micro switch that is disposed on one of said lateral walls, said first swing seat of said driving unit having a press lever that depresses said micro switch when said holding seat is at the brewing position and that is separated from said micro switch when said holding seat is moved away from the brewing position.

9. The coffee brewer as claimed in claim 8, wherein said holding seat is proximate to said front wall when being at the brewing position, and is distal from said front wall when being at the reloading position, said bottom wall further having a rear segment, said holding seat further having a pull plate, said holding mechanism further including at least one extension spring that is connected between said pull plate of said holding seat and said rear segment of said bottom wall for resiliently biasing said holding seat toward the reloading position.

10. The coffee brewer as claimed in claim 7, wherein said front wall is formed with an outlet passage adapted for exit of brewed coffee, said coffee brewer further comprising a brewing unit, said brewing unit including a sealing ring that is disposed at one side of said front wall proximate to said holding seat and that corresponds in position to said outlet passage, a porous plate member that is mounted on said sealing ring and that has a plurality of through holes formed therethrough, and an inlet tube assembly that is disposed on said holding seat for introducing water into said holding space in said holding seat.

11. The coffee brewer as claimed in claim 1, wherein said frame body includes two guiding grooves that are arranged in the lateral direction, said holding seat having a guide plate that engages slidably said guiding grooves.

12. The coffee brewer as claimed in claim 8, wherein said holding mechanism further includes at least one spring plate that is disposed on one of said lateral walls, and at least one friction member that is co-rotatably mounted to said first swing seat for being in frictional contact with said spring plate so as to retard the movement of said holding seat relative to said frame body.

13. The coffee brewer as claimed in claim 7, wherein said holding mechanism further includes a cover member that is co-movable with said holding seat and that covers said loading opening when said holding seat is at the brewing position.

14. The coffee brewer as claimed in claim 13, wherein said cover member has a front segment that covers said loading opening when said holding seat is at the brewing position, and a rear segment that partially covers said driving unit when said holding seat is at the reloading position.

15. The coffee brewer as claimed in claim 7, wherein said driving unit includes a first swing seat that is rotatably mounted to said frame body, at least one swing arm that is pivotally connected to said first swing seat, a pivot axle that pivotally interconnects said holding seat and said swing arm, a second swing seat that is rotatably mounted to said frame body, a link member that is pivotally connected between said first and second swing seats, and an operating member that is co-movably connected to said second swing seat.

16. The coffee brewer as claimed in claim 1, wherein a distance between said wing portions of said rack members of said reloading mechanisms when each of said rack members is at the loading position being smaller than that between said wing portions of said rack members when each of said rack members is at the unloading position.

* * * * *